US 8,380,373 B2

(12) United States Patent
Julich et al.

(10) Patent No.: US 8,380,373 B2
(45) Date of Patent: Feb. 19, 2013

(54) SYSTEM AND METHOD FOR DISPATCHING BY EXCEPTION

(75) Inventors: Paul M. Julich, Indialantic, FL (US); Mitchell Scott Wills, Melbourne, FL (US); Joanne Maceo, Rockledge, FL (US); Joseph Wesley Philp, Indialantic, FL (US); Brian Smith, Melbourne, FL (US); Christopher P. Roney, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 701 days.

(21) Appl. No.: 12/153,948

(22) Filed: May 28, 2008

(65) Prior Publication Data

US 2009/0143927 A1    Jun. 4, 2009

Related U.S. Application Data

(63) Continuation of application No. 10/785,059, filed on Feb. 25, 2004, now abandoned.

(51) Int. Cl.
*B61L 27/04* (2006.01)
*G06F 17/00* (2006.01)
*B61L 27/00* (2006.01)

(52) U.S. Cl. ............. 701/19; 701/117; 246/167 R

(58) Field of Classification Search ........... 701/19, 701/20, 117, 1; 342/36; 246/3, 2 R, 167 R; 104/162, 307
See application file for complete search history.

(56) References Cited

U.S. PATENT DOCUMENTS

| | | | | |
|---|---|---|---|---|
| 5,129,605 A | * | 7/1992 | Burns et al. | 246/5 |
| 5,420,883 A | * | 5/1995 | Swensen et al. | 375/138 |
| 5,659,734 A | * | 8/1997 | Tsuruta et al. | 1/1 |
| 5,836,529 A | * | 11/1998 | Gibbs | 246/122 R |
| 6,154,735 A | * | 11/2000 | Crone | 706/45 |
| 6,415,219 B1 | * | 7/2002 | Degodyuk | 701/117 |
| 6,459,964 B1 | * | 10/2002 | Vu et al. | 701/19 |
| 6,631,322 B1 | * | 10/2003 | Arthur et al. | 701/211 |
| 6,753,784 B1 | * | 6/2004 | Sznaider et al. | 340/601 |
| 7,386,391 B2 | * | 6/2008 | Morariu et al. | 701/117 |
| 2003/0055666 A1 | * | 3/2003 | Roddy et al. | 705/1 |
| 2003/0236598 A1 | * | 12/2003 | Villarreal Antelo et al. | 701/19 |
| 2004/0176884 A1 | * | 9/2004 | Hungate et al. | 701/19 |

FOREIGN PATENT DOCUMENTS

JP    05016810    *  1/1993

OTHER PUBLICATIONS

Galliers et al., "An impact analysis method for safety-critical user interface design" Dec. 1999, ACM Transactions on Computer-Human Interaction, vol. 6, No. 4, pp. 341-369.*
Sparozic, N.R., "An automated train dispatching system" Mar. 1994, Railroad Conference, 1994., Proceedings of the 1994 ASME/IEEE Joint, pp. 47-50.*
Machine generated english translation of JP05-016810.*

* cited by examiner

*Primary Examiner* — Christine Behncke
(74) *Attorney, Agent, or Firm* — GE Global Patent Operation; John A. Kramer

(57) ABSTRACT

A system and method for controlling the movement of plural trains over a rail network, where the rail network is divided into at least one control area with a dispatcher assigned to manage the movement of trains in a control area by predicting the occurrence of events along the network based on the movement plan and prompting the dispatcher to provide information or take specified actions relating to the predicted events.

11 Claims, 2 Drawing Sheets

SYSTEM AND METHOD FOR DISPATCHING BY EXCEPTION

This application is a continuation of co-pending U.S. application Ser. No. 10/785,059, filed on Feb. 25, 2004 which claims the benefit of U.S. Provisional Application 60/449,849 filed on Feb. 27, 2003. This application is also a continuation-in-part of co-pending application Ser. No. 10/438,901 filed on May 16, 2003, which is a divisional application of and claims benefit to application Ser. No. 09/476,615 filed Dec. 31, 1999, now U.S. Pat. No. 7,092,894, which is a Continuation-in-Part application of and claims benefit of application Ser. No. 09/129,863 filed Aug. 6, 1998, now U.S. Pat. No. 6,154,735, which is a divisional application of and claims benefit of application Ser. No. 08/787,168 filed Jan. 23, 1997, now U.S. Pat. No. 5,794,172, which is a divisional application of and claims benefit from application Ser. No. 08/299,271 filed Sep. 1, 1994, now U.S. Pat. No. 5,623,413.

BACKGROUND

The development of a train schedule for a global rail network, i.e., nationwide, is difficult on a real time basis due to the complexity of the problem of controlling many trains competing for limited resources simultaneously. Rail networks typically contain tens of thousands of miles of track, thousands of locomotives and hundreds of thousands of freight cars. At any one moment, thousands of trains and maintenance vehicles may be competing for a limited amount of track. To manage consistent scheduled service in this environment, railroads use the "divide and conquer" technique to partition the railroad network into several control territories and generate a local movement plan for each control territory to thereby distribute the complexity of the scheduling problem over many scheduling resources. Human train dispatchers are assigned to these control territories, and have the responsibility to smoothly transit trains and equipment across the control territory, with minimum delay in accordance with the corresponding movement plan for the control territory. Multiple dispatchers, each controlling a predefined portion of the railroad, comprise the paradigm for modern day computer-based railroad dispatching systems.

In this environment, the dispatcher is expected to solve complex movement problems in real time. For example, dispatchers must consider the limited track resources, length of trains, length of available sidings, train meet and pass points, maintenance requests for track time, engine availability, etc. Dispatching can become a stressful environment, and while safeguards are in place with signaling systems in the field, dispatcher mistakes could cost lives and frequently results in significant decreases in performance for the railroad. To ease the burden, computer processing scheduling systems are used to help dispatchers "see" their control area, and external systems provide a constant flow of information about the state of the railroad. This information flow includes train schedules, customer commitments, maintenance schedules, train consists, track outages, crew information, weather and other dynamic factors that directly affect the daily operations of the railroad. As more systems are computerized, dispatchers receive more accurate information, however; the volume of information is growing at a rate that makes it increasingly difficult for a dispatcher to formulate decisions and actions in real time. Because of information overload, and the decision structures of typical dispatch systems, dispatchers lack insight into effects of their actions on the entire route of the train, or the effects to the railroad as a whole. Several train dispatchers will "touch" a train as it traverses its route across the railroad. With limited insight information and a predefined decision structure, it is inevitable that one dispatcher's action, while perhaps appropriate within the context of the dispatcher's territory, could render overall train operations less than optimal.

Without full comprehension of the complex adjacent territories or the relative value of a train to the railroad at any one particular instant, the dispatcher is ill equipped to make optimum dispatch decisions, even within their control own territory. As such, a dispatcher may route a train into an adjacent territory, only to discover that by doing so, the end result is more congestion for the overall railroad. In this instance the correct decision would have been to hold the train within the dispatcher's territory at an available siding or yard with ample capacity, and wait until the congestion reduces or clears. Another situation in which the dispatcher lacks adequate information about the global network to make the most optimal decision may occur where several trains need to pass through a congested track area, and there is not enough available track to accommodate all simultaneously. The dispatcher has to quickly decide which trains to "side" (place in an available siding) in order to let other trains pass. In today's dispatching environments, there is insufficient information about a train in context with all other trains in other control territories in order for the dispatcher to make the best decision for the railroad as a whole, due to the lack of coordination of the movement of trains from one control territory to an adjacent control territory. However, if the added body of information needed for system-wide management were to be made available to the dispatcher, it would most likely increase the complexity of the dispatching function beyond that which could be safely and reliably managed by the current human based approach.

Currently, a dispatcher's view of the controlled railroad territory can be considered myopic. Dispatchers view and processes information only within their own control territories and have little or no insight into the operation of adjoining territories, or the railroad network as a whole. As such, the dispatcher is the decision center for his or her territory. Current dispatch systems simply implement controls as a result of the individual dispatcher's decisions on small portions of the railroad network. The controlling dispatchers are expected to resolve conflicts between movement of objects on the track (e.g. trains, maintenance vehicles, survey vehicles, etc.) and the available track resource limitations (e.g. limited number of tracks, tracks out of service, consideration of safety of maintenance crews near active tracks) as they occur, with little advanced insight or warning.

For example, if the railroad submits a request for maintenance on a portion of the rail network to the cognizant dispatcher, the dispatcher is required to facilitate the maintenance by altering the predetermined movement plan. The dispatcher typically does this without providing input to the computer processor based movement planners that planned the movement of trains through the area. If the dispatcher's ad hoc scheduling of maintenance interrupts the execution of the movement plan, the effect on the movement plan is not realized until the maintenance has begun. Once the impact of the unscheduled maintenance is eventually appreciated and accommodated by the movement plan, further impacts, possibly more detrimental, to the movement plan may have already occurred In the present application, the movement of trains is improved in several aspects. In one aspect of the present invention, the communications between the dispatcher and the computer processor based planning system is increased. In another aspect of the present invention, responsibilities which have traditionally been performed by the dispatcher are shifted to the computer processor based planning system. In still another aspect of the present invention, interactive displays are provided to the dispatcher facilitating the transfer of information to and the feedback from the dispatcher.

The technical effect is that computer processor based modules can be used with a centralized movement planner and decision maker to assume many of the routine duties of the dispatcher which allows the dispatcher to more efficiently manage the movement of trains thorough his control area and resolve conflicts which arise.

The advantages of the present invention will be readily apparent to one skilled in the art to which it pertains from a perusal of the claims, the appended drawings, and the following detailed description.

DETAILED DESCRIPTION OF THE DRAWINGS

In one aspect of the present invention, the efficiency of dispatching plural trains over a network rail system is increased by unifying the decision center away from the individual dispatchers and thus relieving the dispatcher from complex movement planning decisions. Instead the dispatcher is more efficiently utilized to provided information to a computer processor based dispatching system which provides a more optimized movement plan for the entire network rail system. Further, instead of requiring the dispatcher to evaluate complex scenarios which may impact the movement of the trains not only through the dispatcher's control area, but also across the entire rail network, the dispatcher may be advantageously utilized to supply information as soon as possible into the movement planning process to facilitate the automatic execution of optimum plans and routine dispatcher functions.

The development of a plan to move trains through a rail network is subject to numerous constraints and is generally accomplished using a computer processor based planning system. Typically the movement planner provided a network-wide movement plan and a group of dispatchers were tasked to manage the control of the trains in their respective control areas in accordance with the global movement plan. The present invention is directed to changing the traditional coupling between the movement planning function and the dispatching function.

A railway network is traditionally partitioned into a plurality of control areas with a dispatcher assigned to manage the flow of trains and otherwise control the track resources in the dispatcher's respective control area. The present application maintains control of the trains and associated resources with the dispatcher; but facilitates the control with an optimized plan that best fits the objectives of the entire railroad. Where current systems use de-centralized decision centers normally managed by the dispatcher, the present application is directed to centralized automated decision centers which provide automated, optimized planning information to dispatchers to manage the resources in their respective control territories. In other words, much of the real time movement decisions currently made by dispatchers will be alleviated by decisions made by a computer processor at a higher railroad enterprise or network-wide level, based on an optimized computer processor based movement planners. Once this is accomplished, dispatchers are then free to spend time focusing on implementing the plan and handling exceptions.

Figure 1:
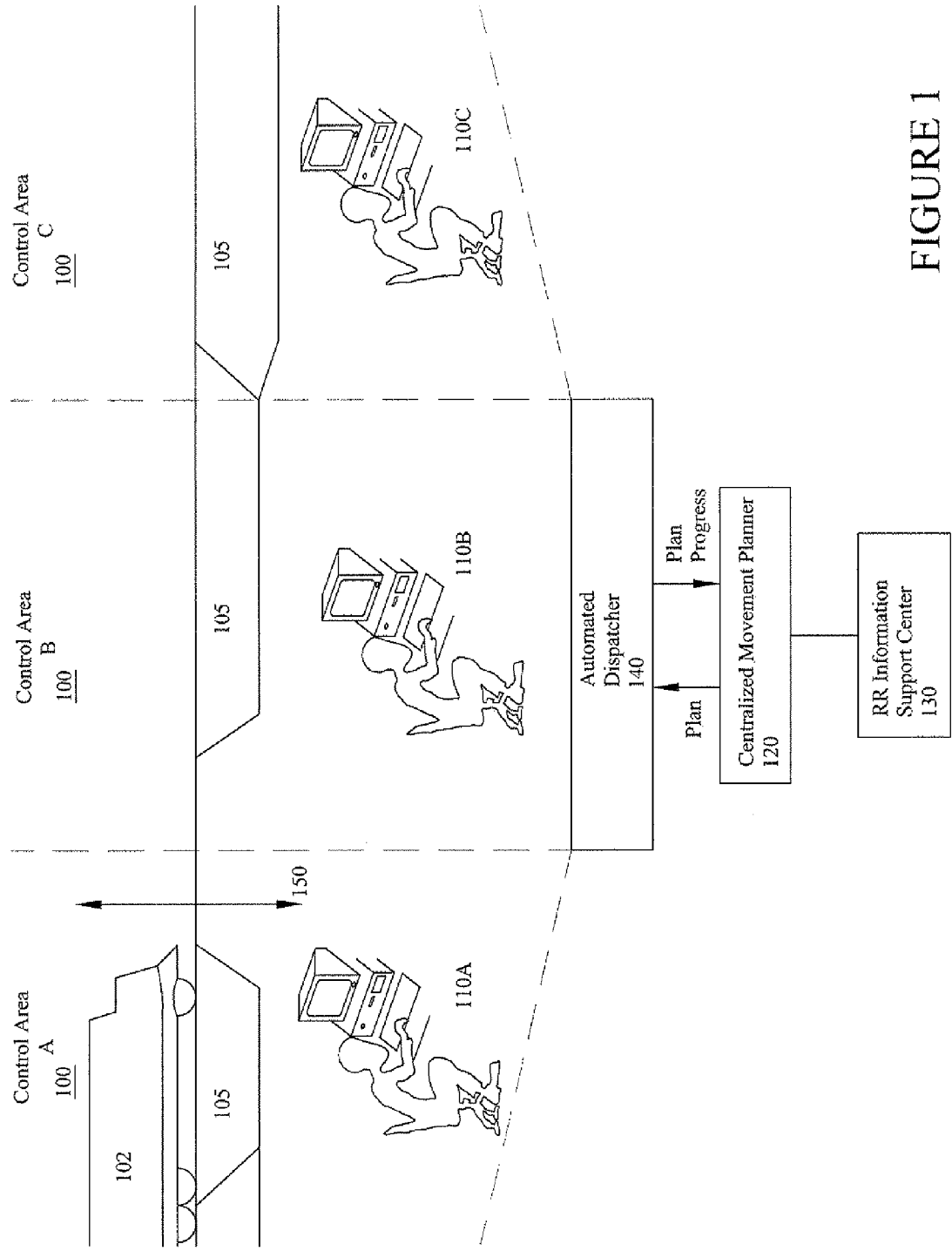
FIG. 1 is a simplified pictorial representation of one embodiment of the present invention for use with a rail network divided into control areas

FIG. 1 illustrates one embodiment of the present invention. The global rail network 105 can be divided into one or more control areas 100 (100A-100C), each of which has a dispatcher 110 (110A-110C) assigned to manage the movement of trains (102) through his respective control area 100. A centralized movement planner 120 provides a network based movement plan for the global rail network 105 based on input received from the railroad information support center 130. The railroad information support center 130 provides information related to the track resources and other information suitable to plan the use of the resources. Suitable information may include origin and destination for a train as well as activity locations and key waypoints on the trains' route. It may also include target departure and arrival times for origin and destination as well as key intermediate waypoints. It may also provide default consist data to be used for preliminary planning until more specific data is available and a default cost function developed for each train.

Centralized movement planner 120 generates a movement plan for the resources in the track network 105 and provides the plan to the automated dispatcher 140. Movement planner 120 may also received updates on the execution of the movement plan from automated dispatcher 140 and can update the current movement plan. Automated dispatcher 140 provides each of the dispatchers 110 with the movement plan to manage the train resources in their respective control areas 110.

The automated dispatcher 140 can be implemented using computer usable medium having a computer readable code executed by special purpose or general purpose computers. The automated dispatcher 140 communicates with trains 102 on the network of track via a suitable communication link 150, such as a cellular telephone, satellite or wayside signaling.

Even in this new paradigm, some of the dispatcher's duties will remain the same, however, the duties will then be in support of an optimized plan, rather than directed to detailed hands-on implementation of a plan. The dispatcher will continue to issue or approve issuance of movement authorities and track restrictions, schedule maintenance of way activities and communicate with train crews, yard managers and other railroad personnel. But, all of these activities will be consistent with an optimized operating plan for the railroad. While the dispatcher will rely on the movement planner to solve the complex problem of optimizing movement of trains, the dispatcher will be actively involved in entering the necessary data required to maintain an optimized plan and identify exceptions to the plan. For example, if a train is performing a scheduled work activity (e.g. picking up or setting out cars) and the train crew informs the dispatcher that they expect to incur additional delays, then the dispatcher can provide that delay information into the movement planner system through automated dispatcher 140 on a prospective basis and allow the centralized movement planner 120 to evaluate the impact on the network-based movement plan. In the prior art systems, the movement planner did not typically receive information regarding expected delays, and thus the movement planner could only provide retrospective relief for a delay after the delay had already been encountered, if at all. By providing early notification of a prospective delay, the movement planner can take the expected delay into account and reduce and even obviate its impact on the remainder of the movement plan. The movement planner may then adjust the movement of other trains accordingly, based on the updated information.

Note that in today's dispatching environment, the dispatcher would need to make many local decisions to accommodate this additional delay (whether to allow a following train to pass, hold trains, etc), and because of the dispatcher's limited information about all other trains, those decisions may not be the best for the optimum operation of the railroad.

Determining optimum movement plans for trains in advance, and providing the dispatcher with automated mechanisms to implement the plan, will ultimately shift the focus of the dispatcher from real time reactive interactions with train movement to more of a plan optimization and exception handling role. The role of the dispatcher, in this new paradigm, is to communicate known or expected exceptions to the movement plan, thereby providing the necessary information to minimize conflicts before the train is dispatched. In return, the dispatch system, coupled with the movement planner, can reduce routine tasks and provide information to the dispatcher to increase efficiency and reduce workload. The effective use of a priori planning to reduce dispatcher decisions to the point where intervention is only required on an exception basis in one feature of the present application.

In another aspect of the present invention the amount and type of information passed between the automated planning system and the dispatcher is improved. Portions of the planning process that used to be accomplished manually by the dispatcher can now be performed automatically by the planning system in advance of the generation of the movement plan. For example, enhanced planning is facilitated by automatically supplying the movement planner 120 with information from the railroad information support center 130 which associates train consist events (e.g., pickups, crew changes, engine destinations) with planned train activities that occupy track resources for the duration of a dwell time, so that maintenance of the traditional train sheet data (via electronic messaging and user data entry) is automatically reflected in the train trip specifications for use for movement planning. The information can be provided automatically from external electronic systems without any action required from the dispatcher.

Figure 2:
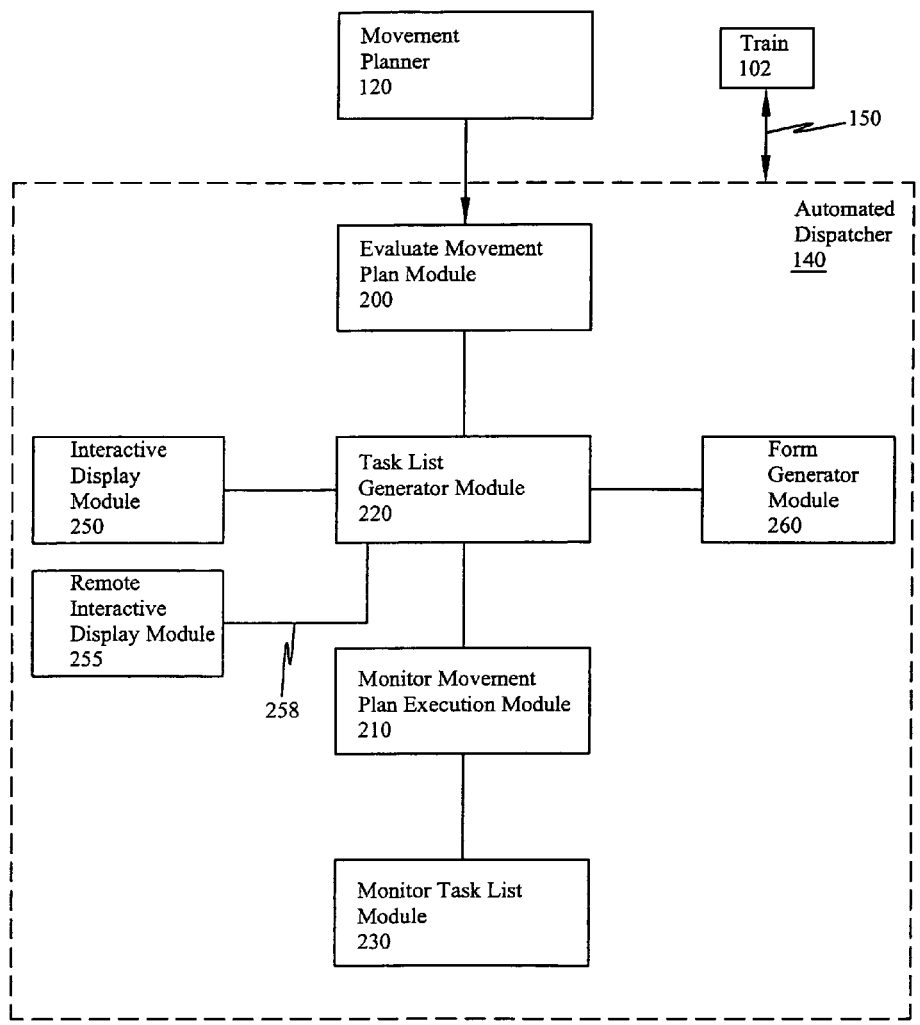
FIG. 2 is a simplified functional block diagram of the automated dispatcher of FIG. 1.

In another aspect of the present invention, the present dispatch system of this invention may provide information in addition to the traditional movement plan to assist the dispatcher in performing his duties. FIG. 2 illustrates one embodiment of the system of the present invention, in several modules constituting the automated dispatcher 140 working together to predict the occurrence of events based on the plan movement of the train and associated resources. The movement plan provided by movement planner 120 may be evaluated by the automated dispatcher 140 in the evaluate movement plan module 200. The evaluate movement plan module can predict the expected occurrence of events based on the current movement plan and other suitable factors including historical train performance, train characteristics, track database, topology database, crew information, operating rules and guidelines and weather information. Based on the predicted events, the automated dispatcher can generate a task list identifying specific actions to be taken by the dispatcher in the task list generator module 220. Historical train performance may include suitable factors which may help predict the future performance of a train including configuration of work locations for trains performing specific types of activities (e.g., fueling stations), configuration of work locations by train type, direction of travel, associated stations or specific train, and configuration of automatic routing parameters (such as automatic resumption of authority generation.). Suitable factors for train characteristics include type, power, and physical constraints (e.g., extended height). In addition to the amount and configuration of track, other suitable factors in the track database include yard capacity and the work flow through the yard, i.e., number of trains per unit time. The crew information may include past performances of particular crews or of particular dispatchers. Suitable factors for crew performance may include type of train, length of trip in time and track segments and amount of deviation from planned movement. The statistical information suitable for evaluating a dispatcher includes number of track segments controlled by the dispatcher, the mode of the tracks while under the dispatcher's control, the number of trains within the territories by track mode and the amount of deviation from movement plans.

The evaluate movement plan module 200 also takes into consideration the interdependency of different trains. For example certain activities such as block swaps, helper operations and middle annul situations require the participation of two or more trains or resources. The evaluate movement plan module 200 keeps track of activities requiring linking between trains and can provide notification to the dispatcher of such linked activities and alerts to the dispatcher when the dispatcher takes any action which may impact at least one of the trains in a linked activity.

The task list generator module 220 provides the task list to the dispatcher through interactive display module 250. The task list generator module 220 can prompt the dispatcher to take a desired action, request information, provided appropriate forms and assist the dispatcher in other required duties. The occurrence of the predicted events may be monitored in the monitor movement plan execution module 210, and the dispatcher may be prompted to take additional specific actions in response to the occurrence predicted events in task list generator module 220. One suitable way for prompting the dispatcher to take specific action is through the generation of a task list for actions to be taken by the dispatcher provided by interactive display module 250. The dispatch system can subsequently track the dispatchers completion of the tasks identified on the task list in the monitor task list module 230. For example, a task can be identified to remind the dispatcher to create a new movement authority for a train when the current movement authority approaches the termination limits. This avoids stopping trains to wait for movement authorities. Any action taken by the dispatcher at interactive display module 250 can be provided to movement planner 120 to take into account in the next movement plan generation cycle. The modules may be a computer readable program code embodied in a computer usable medium with a suitable computer, such as a general or specific purpose computer.

In another aspect of the present invention, the dispatcher can be provided with a dynamic task list at interactive display module 250. The dynamic task list not only specifies the tasks to be performed by the dispatcher, but it also automatically links the dispatcher display to the proper data input form in form generator module 260. For example, the automated dispatch system can predict the movement of a train through a control area and can predict when a movement report should be received regarding the location of the train at evaluate movement plan module 200. If a movement report is not received with some specified time as determined by the monitor movement plan execution module, the dispatch system may prompt the dispatcher to provide a delay report or otherwise identify the source of the delay of the train through form generation module 260. The delay report may be pre-filled with information known at the time of the generation of the report. By prompting the dispatcher to submit a delay report the cause of the delay can then be utilized by the movement plan to modify the network wide movement plan and account for any additional delays which may also be expected. Thus, a potential delay can be accounted for before it is actually encountered and before its impact would otherwise detrimentally effect the movement plan.

In another aspect of the present invention, the dynamic task list can populate the data input form with information known at the time it is generated. Thus, a delay report may be pre-populated with the probable causes based on the activities performed by the train or obstructing occurrences previously identified by the dispatcher. Thus, the automated movement planner receives the information it needs to develop the optimum plan, while reminding the dispatcher of tasks that may be required by current conditions on train and track resources.

In another aspect of the present invention, a delay can detected if the train fails to traverse a portion of its route within an expected time. For example, a delay can be identified solely on the basis of expected transit time over a segment of track. For a given segment of track, an estimated transversal time can be predicted based on an unopposed run time of the train. If the train is unable to transverse the given track segment, an estimated delay can be predicted and the planner may be able to automatically attribute the delay to a known cause. (e.g., weather) based on information previously known by the automated dispatcher. The automated dispatcher may then be able to automatically anticipate the occurrence of additional delay for trains that traverse the region.

In another aspect of the present invention, functions that are typically carried out by a human dispatcher can be accomplished using a computer processor based dispatcher 140. For example, there exists many different types of track authorities that may be issued to trains and other resources utilizing the track network. Typically, in order to determine the appropriate authority to be issued the dispatcher was required to consider many factors including the underlying track type (e.g., bi-directional, unidirectional), the work being performed (e.g., maintenance of way), and the party to which the authority applies. The issuance of the proper authority is a safety sensitive time consuming constraint on the dispatcher. In one embodiment, the present invention shifts the consideration of these factors from the dispatcher to the computer processor based dispatcher to automatically provide an automatic unified configurable track authority using form generation module 260, based on the same factors previously considered by the dispatcher. The necessary content and authority type is determined based on the addressee type and limits of the authority, freeing dispatchers, train crews and field crews from having to be proficient in different form types for different railroad locations. Thus, a single dynamically configurable authority form can replace the myriad of authority forms previously used. Additionally, the dispatch system my provide an enhanced display to the dispatcher to allow the dispatcher to quickly determine all trains that are within the range of limits of an authority, or approaching limits of an authority using the interactive display module 250, and notify the dispatcher by generating an alert with the task list generation module 220. The interactive display module 250 may assist the dispatcher in identifying whether trains are in an area covered by a track authority and eliminates possible human error due to canceling and authority that is still needed by a train. It may also facilitate the removal of authorities (clean up) that are no longer being used, thus freeing resources to optimize the plan.

Additionally, the dispatching system may accept remote electronic authority requests from the field, automatically determining authority type, then approving or disapproving or requesting dispatcher review based on the current state of other authorities, field indications, and train locations.

Another dispatching function which may be assumed by the dispatching system is the automatic issuance of train bulletins. A train bulletin is issued to a train and includes multiple bulletin items which informs the train crew of events and circumstances which may constrain the movement of the train along its planned route. Information in a bulletin item that constrains one or more trains must also be conveyed to the movement planner. Suitable information that my be contained in an bulletin item include train speed restrictions, track speed restrictions, track to be avoided, hazardous train movement restrictions, etc. Typically, train bulletins are issued by the cognizant dispatcher to the crew of the trains in the dispatchers control area for the portion of its route between crew change points prior to departure of the train. The train bulletin may include the control area of more than one dispatcher. The train bulletin is typically communicated by fax or other means which provides notice to the crew, but the dispatcher must take separate and independent action to ensure that the information contained in the train bulletin is also conveyed to the movement planner. In one embodiment of the present invention, configurable bulletin items are provided to the dispatcher by the form generation module 260. The form generation module 260 may pre-fill the form with information known when the form was generated and provides the train bulletin containing bulletin item information to the crews as well as the movement planner 120. Bulletin item types are made configurable so that the administrators can create bulletin item types that are easy to use for specific situations. The movement planner can automatically use planning constraints contained in each bulletin item applicable to a train, including constraints contained in it's configurable components, in order to update the movement plan if necessary. The movement planner receives the configurable bulletin items from the automated dispatcher 140 and identifies planning constraints and updates the movement plan accordingly. For example, the dispatcher may issue a bulletin item that reduces the allowable speed for trains traveling over a specified portion of the track. The movement planner 120 recognizes the reduced speed limit contained in the bulletin item received from the automated dispatcher 140 and adjusts the movement plan to account for the reduced speed on the specified portion of the track.

In another yet another aspect of the present invention, the dispatch system may interrogate weather service information provided by railroad information support center 130 and automatically account for the weather in planning the movement of the trains update including disseminating weather information in bulletin items, train bulletin and authorities, based on the route of the train traversing the weather affected area and place weather alerts on appropriate geographic region of the dispatcher's display.

Another area in which the dispatching system may assume the duties normally reserved for the dispatcher is helper operations. Typically, it was the sole responsibility for the dispatcher to identify those situations in which helper operations (i.e., the use of a helper locomotive to provide temporary additional power for moving a train) were required (e.g. laden coal train traversing a mountain pass). In one embodiment of the present invention, the dispatching system automatically identifies circumstances which may result in underpowered trains due to track conditions (e.g., grade and/or weather and/or curvature topology) in the evaluate movement planner module 200 and schedule necessary helper power to assist train in route. The dispatching system determines the necessity of a helper based on suitable factors such as minimum power requirements by topological area and direction of travel as determined by the track database, areas where helper operations are typically performed, and predicted train performance based on engine and train consist (horsepower, weight on drivers, trailing tonnage, etc.) in the evaluate movement plan module 200. The task list generator module 220 will create a task at the appropriate time if a helper hasn't been assigned and the evaluate movement plan modules 200 determines a helper is needed. A list of helpers available for assignment will then be displayed for the dispatcher by the interactive display module 250. In addition, the dispatching system may alert the dispatcher in the task list generator module 220 when a train is planned through a helper area and a helper has not been assigned as determined by the monitor movement plan execution module 210 and the monitor task list module 230, when the parameters of the train and track would indicate the need for one. The automated dispatcher may provide a display of helper train assignments at interactive display 250 to facilitate efficient tactical management of helpers operations by the dispatcher In another embodiment of the present invention, an enhanced display is provided to the dispatcher which facilitates interactive coordination with the dispatcher system. For example, an enhanced display may allow the dispatcher to view the planned trajectory of a train, and may give the dispatcher the ability to view increased details of the trajectory using well known "drill down" technology in the interactive display module 250. In addition the interactive display may allow the dispatcher to provide alterations to the movement plan. For example, a trip plan display may be provided to the dispatcher which includes the details of a selected route for a train. The dispatcher may have the ability through well known graphical user interface technology to select the identified route for a train and make alterations as the circumstances require. For example, a Train A (not shown) may be planned to a portion of track which is consistent with the default track over which the train routinely traverses. The dispatcher may become aware of circumstances which require a deviation from the routine expected path of Train A and the display affords the dispatcher the opportunity to selected the portion of the track that is no longer available to Train A and provide alternative track to Train A. The alternative track would be identified and sent to the movement planner to accommodate Train A to utilize this track. Additionally, the dispatcher has the ability to affect the selection of routes using the enhanced display provided by interactive display module 250. For example, alternate routes may be available to a train traveling from Point A to Point B (e.g., through a terminal area). The alternative routes may include track that is owned by several railroads or track that is shared by the railroad. The dispatcher, using well known graphical interface user techniques (e.g., drag and drop technology), may select a waypoint or an activity which requires use of one of the selected tracks which influences the route that the planner plans for the movement of the train. The graphical user interface may allow the dispatcher to select only those portions of the track which are available to the dispatcher (i.e., unavailable routes may be highlighted in a different color than the available routes and may have all interactivity features disabled). Thus the dispatcher would be able to drag and drop to a section of the track that was made accessible by the graphical user interface.

The interactive display may also facilitate communications between the dispatcher and the trains and other resources via communications link 150. For example, the communication system parameters (such as radio frequency, radio/cell tower location and transmission range, etc) may be indexed with track topography (geographical reference) database and provided to the dispatcher with interactive display module 250. Train and work crew locations are typically known by the dispatch system; and therefore, proper communication means (e.g. radio, radio tower and frequency or even fixed phone, satellite and cellular phone numbers of the crew) can be automatically determined and established by the dispatcher system through interactive display module 250. For example, to communicate with a train, the dispatcher would select the train symbol from the interactive display and indicate the desire to open a radio channel to the train. The automated dispatch system would determine the train's location, cross reference that location with radio unit identifiers in the track topology database, then send this information to the radio control system to establish the proper communications link.

The enhanced interactive display may also provide the dispatcher with the ability to view other dispatch territories, including advanced indication of and information about approaching trains into a dispatcher's control territory. Dispatchers may be given access to any part of the railroad, and the performance of any train, not just the portion of the plan and trains in their immediate cognizance. Additionally the enhanced interactive display may also be made available at a location remote from the dispatcher's location. For example, remote interactive display module 255 may provide a display for a yard manager located in the operations center in the railyard. The interactive display module 255 may allow the yard manager less access than that of the display module for the dispatcher, but allow the yard manger to provide information relating to the movement of the trains in the yard which may impact the movement plan. For example, the yard manager may provide notification of an expected delay due to some occurrence or incident in the yard affecting the movement of trains. Additionally, the remote interactive display module 255 may also provide the yard manager with a means to specify the arrival and departure tracks for specific trains and to specify the departure order and departure time of trains. The dispatch system can automatically determine the authority type and approve the issuance of the authority based on the current state of other existing authorities, field indications and train locations. The remote interactive display module 255 is linked with one or more of the other modules of the automated dispatcher 140 via a suitable communications link 258, such as a LAN, WAN or the Internet.

In another embodiment of the present invention, the dispatcher can request analysis feedback from the dispatch system for proposed changes to the movement plan. For example, the dispatcher may propose hypothetical constraints (e.g., a selected portion of track needs to be taken out of service for two hours today) through interactive display module 250 in order to view the impact of the hypothetical constraint on the movement plan. If the hypothetical constraint will have minimal impact on the movement plan, the dispatcher may request that the constraint be treated as real rather than hypothetical and that the movement plan be updated accordingly. Thus, the dispatcher has the ability to propose "what-if" scenarios and to evaluate the impact of the any proposed modifications, prior to the implementation of such modification.

In addition, the interactive display modules 250 and 255 may also facilitate planning by allowing the reservation of resources for the future. Typically, the use of resources and the issuance of movement authorities was done on an ad hoc basis, the movement authorities were issued when needed and not planned in advance. By providing the movement planner with information in advance of its requirement, the movement planner may be have more options available to it to facilitate the utilization of a resource. For example, a yard manager may request a maintenance of way authority for the future, and the advance planning of such a request makes it less likely that ad hoc dispatcher interaction would be required.

In another aspect of the present invention, the dispatch system allows real time configuration of operating rules and other rule compliance constraints. In the traditional dispatching paradigm, the dispatcher had to ensure alterations to the movement plan conformed to a series of complex operating rules. If the operating rules changed or the Federal Railroad Association implemented a new rule, it was typically required that the software vendor responsible for the dispatching system make software modifications to reflect the change in rules. In one embodiment, the present invention allows the railroad or the dispatcher to enter the rule changes directly into the dispatch system through a configurable parameter using the interactive display module 250 thus obviating any changes to the operating software by a third party.

While preferred embodiments of the present invention have been described, it is understood that the embodiments described are illustrative only and the scope of the invention is to be defined solely by the appended claims when accorded a full range of equivalence, many variations and modifications naturally occurring to those of skill in the art from a perusal hereof

What is claimed:

1. A method of controlling the movement of plural trains over a network of tracks using a network wide computer-based movement planner which creates a movement plan for planning the movement of the trains traveling over the network, the network having a dispatcher being assigned to manage the movement of trains in accordance with the movement plan, comprising:
    predicting the occurrence of events along the network based on the movement plan;
    prompting the dispatcher to take specific actions as a function of the predicted events,
    wherein said prompting is a function of non-compliance of actual events with the predicted events, and wherein said prompting includes requesting the dispatcher to provide information about the non-compliance; and
    modifying the movement plan using the information provided by the dispatcher;
    wherein the information comprises a cause of train delay, and wherein the movement plan is modified using the cause of train delay and to account for additional expected delays based on the cause for train delay.

2. The method of claim 1 wherein said prompting comprises: (i) generating a task list of activities to be performed by the dispatcher as a function of the predicted occurrence of events; and (ii) monitoring the completion of the activities specified on the task list by the dispatcher.

3. The method of claim 1 wherein said predicting includes accessing historical performance information to predict future compliance with movement plan.

4. The method of claim 3 wherein said accessing comprises accessing information relating to configuration of work locations for trains performing specific types of activities.

5. The method of claim 1 wherein said predicting includes determining train performance as a function of train characteristics.

6. A method of controlling the movement of plural trains over a network of tracks using a network wide computer-based movement planner which creates a movement plan for planning the movement of the trains traveling over the network, the network having at least one control area with a dispatcher being assigned to manage the movement of trains for a control area in accordance with the movement plan, comprising:
    generating a task list of activities to be performed by the respective dispatcher as a function of the movement plan, wherein said generating comprises: receiving movement reports regarding the trains in the control area, and prompting a desired activity by the dispatcher on the basis of the non-receipt of a movement report;
    monitoring the execution of the activities specified on the task list by the dispatcher;
    prompting the dispatcher to provide information relating to the non-receipt of the movement report, said prompting including transmitting a form to the dispatcher that is required to be submitted for providing the information; and
    updating the movement plan as a function of the information provided by the dispatcher.

7. The method of claim 6 wherein said generating further comprises: (i) monitoring the movement of trains through the control area, and (ii) prompting a desired activity of the dispatcher as a function of the movement of the trains.

8. The method of claim 6 wherein said prompting comprises notifying the dispatcher to assign a helper locomotive.

9. A method of controlling the movement of plural trains over a network of tracks using a network wide computer-based movement planner which creates a movement plan for planning the movement of the trains traveling over the network, the network having a dispatcher being assigned to manage the movement of trains in accordance with the movement plan, comprising:
    monitoring the movement of trains in accordance with the movement plan;
    identifying incidents of non-conformance with the movement plan;
    alerting the respective dispatcher of an identified incident;
    prompting the dispatcher to provide information about the identified incident;
    updating the movement plan as a function of the information provided by the dispatcher; and
    wherein said monitoring includes receiving periodic movement reports from the train and wherein said identifying includes determining non-receipt of an expected movement report.

10. The method of claim 9 wherein said alerting includes the step of prompting the dispatcher to provide information related to the identified incident.

11. The method of claim 9 wherein said alerting includes communicating information relating to an identified incident for at least one train of a linked activity.

* * * * *

UNITED STATES PATENT AND TRADEMARK OFFICE
CERTIFICATE OF CORRECTION

| | | |
|---|---|---|
| PATENT NO. | : 8,380,373 B2 | Page 1 of 1 |
| APPLICATION NO. | : 12/153948 | |
| DATED | : February 19, 2013 | |
| INVENTOR(S) | : Julich et al. | |

It is certified that error appears in the above-identified patent and that said Letters Patent is hereby corrected as shown below:

On the Title Page, in Item (56), under "OTHER PUBLICATIONS", in Column 2, Line 2, delete "design"" and insert -- design", --, therefor.

On the Title Page, in Item (56), under "OTHER PUBLICATIONS", in Column 2, Line 4, delete "system"" and insert -- system", --, therefor.

On the Title Page, in Item (56), under "OTHER PUBLICATIONS", in Column 2, Line 5, delete "1994."" and insert -- 1994, --, therefor.

In the Specification

In Column 1, Line 9, delete "2003," and insert -- 2003, now U.S. Pat. No. 7,539,624 --, therefor.

In Column 2, Line 62, delete "occurred" and insert -- occurred. --, therefor.

In Column 3, Line 21, delete "areas" and insert -- areas. --, therefor.

In Column 7, Line 25, delete "cause." and insert -- cause --, therefor.

In Column 8, Line 10, delete "my be" and insert -- may be --, therefor.

In Column 9, Line 20, delete "dispatcher" and insert -- dispatcher. --, therefor.

In the Claims:

In Column 11, Line 25, delete "hereof" and insert -- hereof. --, therefor.

Signed and Sealed this
Eighth Day of October, 2013

Teresa Stanek Rea
*Deputy Director of the United States Patent and Trademark Office*